United States Patent [19]

Tretjak

[11] Patent Number: 5,582,810
[45] Date of Patent: Dec. 10, 1996

[54] REMOVAL OF NITROUS OXIDE FROM GASEOUS EFFLUENTS COMPRISED THEREOF

[75] Inventor: Serge Tretjak, Vourles, France

[73] Assignee: Grande Paroisse S.A., Puteaux, France

[21] Appl. No.: 240,487

[22] Filed: May 10, 1994

[30] Foreign Application Priority Data

May 10, 1993 [FR] France .................... 93 05573

[51] Int. Cl.$^6$ ..................... B01J 8/00
[52] U.S. Cl. ......................... 423/239.2
[58] Field of Search ............... 423/239.1, 239.2

[56] References Cited

U.S. PATENT DOCUMENTS

| | | | |
|---|---|---|---|
| 4,571,329 | 2/1986 | Kato et al. | 423/239 |
| 4,867,954 | 9/1989 | Staniulis et al. | 423/239 |
| 4,910,004 | 3/1990 | Hamon et al. | 423/239 |
| 5,059,569 | 10/1991 | Deschamps et al. | 502/78 |
| 5,171,553 | 12/1992 | Li et al. | 423/239 |
| 5,200,162 | 4/1993 | Riley et al. | 423/239 |

FOREIGN PATENT DOCUMENTS

| | | |
|---|---|---|
| 0325511 | 7/1989 | European Pat. Off. |
| 1964419 | 7/1970 | Germany . |
| 4128629 | 3/1993 | Germany . |

OTHER PUBLICATIONS

Chem. Abs. 100:1456624, J. Leglise et al, "Nitrous Oxide Decomposition over Iron–Exchanged Mordenite", J. Catal., 1984 86(2), 392–9 (no month).

Chem. Abs. 97:169727f, A. A. Slinkin et al, "Catalytic Activity of Mordenitas with Multiply Charged Cations During the Decomposition of Nitrous Oxide", Inst. Org. Khim. im. Zelinskogo, Moscow, (USSR), Kinet. Katal. 1982, 23(4), 903–6 (no month).

Database WPI, Sec. Ch, Week 9016, Derwent Pub. Ltd., & JPA–2068120, Sep. 1988, & Patent Abs. of Japan, vol. 014, No. 250 (C–0723) May 29, 1990.

Journal of Catalysis 104, 381–395 (1987), "Mossbauer Spectroscopy & Catalytic Studies of Iron–Exchanged, Silicon–Substituted Y–Zeolite".

Journal of Catalysis 108, 233–246 (1987), "Infrared and Mossauer Spectroscopy Studies of the Interaction of NO with Iron–Exchanged Zeolites".

Journal of Catalysis 110, 330–347 (1988), "Characterization and Catalytic Studies of Y–Zeolites Coexchanged With Iron and a Second Polyvalent Cation".

*Primary Examiner*—Michael Lewis
*Assistant Examiner*—Thomas G. Dunn, Jr.
*Attorney, Agent, or Firm*—Burns, Doane, Swecker & Mathis, L.L.P.

[57] ABSTRACT

The $N_2O$ values in gaseous effluents, notably those produced in various organic syntheses entailing nitric acid oxidation (for example the industrial scale production of adipic acid, of glyoxal and of glyoxylic acid), are catalytically decomposed at elevated temperatures over H-mordenite and ammonium mordenite catalysts, preferably the ammonium mordenites that have been exchanged with iron, cobalt or bismuth.

15 Claims, No Drawings

REMOVAL OF NITROUS OXIDE FROM GASEOUS EFFLUENTS COMPRISED THEREOF

BACKGROUND OF THE INVENTION

1. Field of the Invention

The present invention relates to the treatment of nitrogenous gaseous effluents produced during various organic syntheses comprising a nitric oxidation phase to decease the nitrous oxide content thereof, prior to the release of same into the atmosphere.

2. Description of the Prior Art

Certain organic compound syntheses include the nitric acid oxidation of an intermediary. Thus, for example, adipic acid is produced via nitric oxidation of cyclohexanol, glyoxal via nitric oxidation of acetaldehyde, and glyoxylic acid via nitric oxidation of glyoxal. Nitrous oxide, $N_2O$, is an abundant, undesirable byproduct of these reactions.

These gaseous effluents also contain, in addition to the very large proportion of nitrous oxide, nitrogen, oxygen, carbon dioxide, and nitrogen oxides, such as NO and $NO_2$. The composition of such gases is typically as follows:

$N_2O$: 30–50%
$CO_2$: approximately 5%
$O_2$: 1–4%
$NO_x$: 0–5,000 ppm
$N_2$: complementary amount.

To date, procedures for the purification of such effluents have been limited to removing the $NO_x$ by washing with water in an absorption tower. The gases were then released or vented into the atmosphere without further treatment. This situation has become unacceptable for environmental protection reasons.

The catalytic decomposition of $N_2O$ using a silver-based catalyst supported on aluminum oxide, whether doped or undoped, is known to this art (DE-4,128,629). In reality, this process operates effectively only if the gas/catalyst contact times are sufficiently lengthy (illustrated by relatively low hourly volumetric velocities, i.e., of approximately 4,000 $h^{-1}$). As regards the highest hourly volumetric velocities normally encountered in industry, these aluminum oxide based catalysts are less effective.

The completely different field of nitric acid production via ammonia oxidation also presents the problem of treatment prior to atmospheric release of gaseous effluents containing various nitrogen oxides, the $NO_x$ content of which is sought to be removed before release into the atmosphere. Published French patent applications Nos. 2,613,253 and 2,622,474 describe techniques for destroying $NO_x$ using ammonia and catalyzed by mordenites. Under these conditions, it has been determined that the outlet gases contain virtually as much nitrous oxide as before treatment. These industrial scale results are in apparent contradiction with scientific literature reporting catalysis of the decomposition of nitrous oxide on similar aluminosilicates (in particular, Aparicio et al as regards the catalytic activity of Y zeolites or exchanged mordenites (*J. Catal.*, Vol. 104(a), p. 381; Vol. 108(1), p. 233; Vol. 110(2), p. 330).

SUMMARY OF THE INVENTION

Accordingly, a major object of the present invention is the provision of improved technique for the removal of $N_2O$ values from gaseous effluents comprised thereof.

Briefly, it has now unexpectedly been found that the mordenites can be used directly to effect catalytic decomposition of the nitrous oxide in gases containing very high proportions thereof. To this end, it suffices that the gases coming into contact with the catalyst have a temperature sufficient to ensure that the decomposition reaction will be initiated. Furthermore, it has also been found that such initiation is greatly facilitated if the gases to be treated further contain $NO_x$ ($NO+NO_2$).

DETAILED DESCRIPTION OF BEST MODE AND PREFERRED EMBODIMENTS OF THE INVENTION

More particularly according to the present invention, the mordenites used as catalysts must be free of sodium, or, at very least, their residual sodium content should not exceed 1,000 ppm. This prerequisite does not in itself suffice, since it has also been found that not all of the sodium-free mordenites are suitable for the process of the invention. To the contrary, the acid mordenites (H-mordenites) or ammonium mordenites are required to carry out the process of the invention. The subject process deceases the nitrous oxide content of gases comprising from 30% to 80% of $N_2O$.

The catalytic decomposition according to the invention is via the reaction scheme:

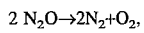

$$2\ N_2O \rightarrow 2N_2 + O_2,$$

this operation being carried out over a zeolite-based catalyst whose active phase is an H-mordenite or an ammonium mordenite.

While U.S. Pat. No. 5,171,553 describes the decomposition of $N_2O$ using a particular crystalline zeolite that has been at least partially ion exchanged, acceptable levels of nitrous oxide destruction are attained only when employing derivatives of precious metals, which are very expensive in industrial applications.

Mordenites having the usual Si/Al ratios are suitable for purposes of this invention, but dealuminized mordenites can also be used. These mordenites are preferably exchanged with one or a plurality of metals, in particular V, Cr, Fe, Co, Ni, Cu, and Bi. The most advantageous mordenites according to the invention are ammonium mordenites in which iron, cobalt, or bismuth is exchanged. To facilitate their use, they are produced in extruded form containing 70–80% mordenite and 20–30% binding agent, e.g., a mixture of kaolinite-based clay and bentonite or aluminum oxide.

The type of mordenite employed is important. Preferred are small-pore mordenites, a term signifying a mordenite which adsorbs only molecules having a kinetic diameter of less than approximately $4.4 \times 10^{-10}$ m and which crystallize in needle form, in contradistinction to the "wide pore" mordenites, which crystallize in spherulitic form and absorb benzene whose kinetic diameter equals $6.6 \times 10^{-10}$.

The process of the invention is carried out at a temperature of from approximately 250° C. to 900°. In actual practice, the gases to be treated are injected into the catalytic reactor at a temperature of from approximately 250°–600° C., and, more preferably, from 300° C. to 500° C., onto the catalyst in a stationary bed, the pressure ranging from 1 to 5 bars. The hourly volumetric velocity is not critical, and advantageously ranges from 10,000 $h^{-1}$ to 50,000 $h^{-1}$. Because the reaction is highly exothermic, the reaction medium can attain a temperature of 700°–900° C. a temperature which can be self-maintained by virtue of the high proportion of nitrous oxide gas. The process is especially effective because it is applied to gases richer in nitrous oxide. When the $N_2O$ contents are relatively low, i.e., approximately 20% to 30%, the presence of nitrogen oxides $NO_x$ in the gases is desirable, since this makes it possible to increase the reaction temperature by up to 100° C. Under these conditions, an energy gain is realized, especially at time of start-up of the system, since, once established, the reaction is self-sustaining.

There appears to be no limit as regards the final nitrous oxide content. In any event, a final proportion of 0.1%, which is considered quite acceptable, is very readily attained.

To carry out the process on an industrial scale, the pronounced exothermic nature of $N_2O$ decomposition should be taken into account. Since it is already necessary to markedly pre-heat the gases coming into contact with the catalyst, the reaction, when using gases containing high concentrations of nitrous oxide, tends to increase the temperature to levels which are not compatible with the resistance of the material. The gases are stabilized in the catalytic bed at temperatures of approximately 700°, by carrying out the reaction in reactor-exchangers of the type used for synthesizing ammonia, and in which the inlet gases are not preheated by an external source using gases produced by the catalytic bed. TVA reactors are described in *Nitrogen Industry*, G. D. Honti, Ed. (Budapest), 1976, pp. 254–255.

The process according to the invention is particularly advantageous for treating gases generated by the manufacture of adipic acid via nitric oxidation of cyclohexanol, whether the cyclohexanol is produced by oxidation of cyclohexane (Stamicarbon or Scientific Design/IFP process) or of phenol (Allied/Monsanto process). It is also particularly applicable for the treatment of gases produced by the manufacture of glyoxal via nitric oxidation of acetaldehyde.

In order to further illustrate the present invention and the advantages thereof, the following specific examples are given, it being understood that same are intended only as illustrative and in nowise limitative.

In Examples 1 and 3, a mordenite/$NH_4$/iron catalyst was used, the mordenite/$N_4$/iron itself being prepared from an ammonium mordenite.

To prepare the ammonium mordenite the following materials were introduced into a reactor: 100 liters of a solution of ammonium nitrate at a concentration of 300 grams per liter, then 25 kg of small-pore sodium mordenite having the general formula:

$$Na_7(AlO_2)_7(SiO_2)_{40}.24H_2O$$

and in which the initial proportion of sodium in the dry product was 5.9% by weight. The suspension was stirred for 15 minutes at 100° C. The mordenite was recovered by filtration and washed on a filter using 100 liters of demineralized water. During this intermediate phase, the sodium content decreased to 4,000 ppm. The aforesaid treatment was repeated and the product subjected to a final wash using 300 liters of demineralized water. The filtered material was dried at 120° C. for 10 hours. The ammonium mordenite powder thus obtained contained only 900 ppm sodium.

80 kg of this mordenite was mixed for four hours with 15 kg kaolinite-based clay and 5 kg bentonite. Using the requisite amount of water, the product was extruded into filaments 3 mm in diameter, which were then calcined at 350° C. for two hours. The filaments were then placed into a solution comprising 60 kg iron sulfate $Fe(SO_4)_2.2H_2O$ in 300 liters of distilled water. The exchange process was permitted to continue at 80° C. for four hours. The filaments were washed in demineralized water (approximately 300 liters), dried overnight in the oven at 120° C. then calcined for four hours at 400° C. The filaments thus produced had a 5% iron content as determined by titration.

In Examples 4 to 7, a mordenite/$NH_4$/cobalt-based catalyst was used that was prepared in accordance with the same process, except that cobalt nitrate was substituted for the iron sulfate.

EXAMPLE 1

Catalytic decomposition of $N_2O$ on mordenite/$NH_4$/iron- effect of the temperature of the gas:

37.5 ml of the catalyst prepared as indicated above were introduced into a stainless steel 50-ml reaction vessel. Using a mass flowmeter, 30% $N_2O$ by volume in a nitrogen stream was introduced, which was heated to various temperatures. The hourly volumetric velocity factor of 13,300 $h^{-1}$ was selected. The gas pressure was three bars absolute. The $N_2O$ content of the gases was monitored at the reaction vessel outlet by gas chromatographic analysis. The yield of nitrous oxide decomposition was calculated as follows:

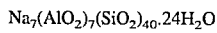

$$r=([N_2O]_{introduced}-[N_2O]_{recovered})/[N_2O]_{introduced}.$$

The following results were obtained:

| Temperature °C. | 440 | 460 | 480 | 500 | 520 | 540 |
|---|---|---|---|---|---|---|
| Yield r % | 5.3 | 22 | 35 | 61.6 | 76.6 | 82 |

It will thus be seen that the process according to the invention effectively destroyed $N_2O$ in gases containing approximately 30% thereof, the activation threshold in the absence of $NO_x$ being about 520° C.

EXAMPLE 2

Effect of the presence of nitrogen oxides $NO_x$

The procedure was carried out under the same conditions as those specified in Example 1, except that, in this case, the experimental apparatus include two mass flowmeters, one for introducing, as in the preceding example, 30% $N_2O$ into the nitrogen gas stream, and the other to introduce varying amounts of $NO_x$. The $NO_x$ gas content was monitored at the reaction vessel outlet by chemiluminescence. In this example, the temperature was set at 440° C. The results were as follows:

| $NO_x$ ppm | 220 | 300 | 400 | 500 | 600 | 800 | 1,200 | 1,600 | 2,000 |
|---|---|---|---|---|---|---|---|---|---|
| r % | 23 | 44 | 70.2 | 70.3 | 72 | 72 | 72 | 73 | 75 |

These results were compared to those obtained in Example 1. It was apparent that the presence of $NO_x$ very appreciably decreased the activation threshold and permitted operation at a lower, more advantageous temperature.

EXAMPLE 3

Effect of the composition of the gases containing. $N_2O$ and $NO_x$

The conditions of Example 2 were maintained, while adjusting the mass flowmeters such as to vary the N20 content between 30% and 50%, and to establish an $NO_x$ content in certain instances at 0, and, at other instances, at 400 ppmv. The results obtained were as follows:

| $N_2O$ (%) | 30 | 30 | 40 | 40 | 50 | 50 |
|---|---|---|---|---|---|---|
| $NO_x$ (ppmv) | 0 | 400 | 0 | 400 | 0 | 400 |
| r % | 7.8 | 70 | 98 | 98 | 99.7 | 99.7 |

It was found that destruction of nitrous oxide became increasingly effective as its initial proportion in the gases increased, and that, at high content levels of approximately 50%, the process was highly effective, even in the absence of $NO_x$.

EXAMPLE 4

Effect of hourly volumetric velocity

The conditions were the same as those of Example 1, except that the catalyst was prepared using cobalt nitrate instead of iron sulfate, that the gas temperature was 440° C., but that the hourly volumetric velocity (HVV) varied from 10,000 to 30,000 $h^{-1}$. The results obtained were as follows:

| HVV ($h^{-1}$) | 10,000 | 20,000 | 30,000 |
|---|---|---|---|
| r % | 93 | 90 | 87 |

EXAMPLE 5

Effect of the presence of nitrogen oxides $NO_x$

The experimental conditions of Example 2 were repeated, except that the catalyst was mordenite/$NH_4$/cobalt, as in Example 4. In this instance, the temperature was 340° C. The results were as follows:

| $NO_x$ | 0 | 200 | 500 | 2,000 |
|---|---|---|---|---|
| r % | 74 | 88 | 91 | 92 |

EXAMPLE 6

Effect of the $N_2O$ content of the gases

The conditions specified in Example 4 were employed, except that the gas temperature was 355° C., that the HVV was 13,000 $h^{-1}$, and that the $N_2O$ content of the gases varied between 30% and 50%. The results were as follows:

| $N_2O$ % | 30 | 40 | 50 |
|---|---|---|---|
| r % | 74 | 95 | 97 |

EXAMPLE 7

Effect of the $N_2O$ content of the gases

The experimental conditions in Example 4 were repeated, except that the temperature was 440° C. and that the gas was no longer nitrogen, but air, thus corresponding to the compositions of the gases as they are vented from adipic acid production reactors. The results were as follows:

| $N_2O$ % | 30 | 40 | 50 |
|---|---|---|---|
| r % | 90 | 92 | 95 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the decomposition of nitrous oxide in a gaseous effluent containing 30–80% $N_2O$, comprising contacting such effluent with an amount of a small pore H-mordenite or ammonium mordenite catalytically effective for decomposition of the nitrous oxide into nitrogen and oxygen and under conditions effective for the decomposition of the nitrous oxide.

2. The process as defined by claim 1, said H-mordenite or ammonium mordenite having a sodium content of less than 1,000 ppm.

3. The process as defined by claim 1, said H-mordenite or ammonium mordenite comprising a dealuminized mordenite.

4. The process as defined by claim 1, said H-mordenite or ammonium mordenite being at least partially ion exchanged with at least one metal.

5. The process as defined by claim 4, said at least one metal comprising V, Cr, Fe, Co, Ni, Cu or Bi.

6. The process as defined by claim 5, said at least one metal comprising iron.

7. The process as defined by claim 5, said at least one metal comprising cobalt.

8. The process as defined by claim 5, said at least one metal comprising bismuth.

9. The process as defined by claim 1, said gaseous effluent further comprising up to 5,000 ppm of $NO_x$.

10. The process as defined by claim 1, said gaseous effluent emanating from the production of adipic acid via the nitric oxidation of cyclohexanol.

11. The process as defined by claim 1, said gaseous effluent emanating from the production of glyoxal via the nitric oxidation of acetaldehyde.

12. The process as defined by claim 1, said gaseous effluent emanating from the production of glyoxylic acid via the nitric oxidation of glyoxal.

13. The process as defined by claim 1, carried out in a reactor-exchanger.

14. The process as defined by claim 1, carried out at a temperature ranging from 250° to 900° C.

15. The process as defined by claim 1, the gaseous effluent thus treated comprising no greater than 0.1% of $N_2O$.

* * * * *